(12) United States Patent
Ihrke et al.

(10) Patent No.: US 7,784,363 B2
(45) Date of Patent: Aug. 31, 2010

(54) PHALANGE TACTILE LOAD CELL

(75) Inventors: Chris A. Ihrke, Hartland, MI (US); Myron A. Diftler, Houston, TX (US); Douglas Martin Linn, White Lake, MI (US); Robert Platt, Houston, TX (US); Bryan Kristian Griffith, Webster, TX (US)

(73) Assignees: GM Global Technology Operations, Inc., Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 46 days.

(21) Appl. No.: 12/241,320

(22) Filed: Sep. 30, 2008

(65) Prior Publication Data

US 2010/0077867 A1 Apr. 1, 2010

(51) Int. Cl.
*G01D 7/00* (2006.01)
(52) U.S. Cl. ................................. 73/862.041
(58) Field of Classification Search ................................. 73/862.041–862.045
See application file for complete search history.

(56) References Cited

U.S. PATENT DOCUMENTS 3,853,000 A * 12/1974 Barnett et al. ................. 73/763
4,283,764 A * 8/1981 Crum et al. ............ 318/568.14
4,628,745 A * 12/1986 Hatamura .............. 73/862.042
4,674,339 A * 6/1987 Hatamura et al. ...... 73/862.042
4,712,431 A * 12/1987 Hatamura .............. 73/862.042
5,014,799 A * 5/1991 Sato et al. .................... 177/211
6,324,918 B1 * 12/2001 Gitis et al. ..................... 73/862
6,701,296 B1 * 3/2004 Kramer et al. .............. 704/270
6,918,622 B2 * 7/2005 Kim et al. ................... 294/106

* cited by examiner

*Primary Examiner*—Lisa M Caputo
*Assistant Examiner*—Freddie Kirkland, III
(74) *Attorney, Agent, or Firm*—John A. Miller; Miller IP Group, PLC

(57) ABSTRACT

A tactile load cell that has particular application for measuring the load on a phalange in a dexterous robot system. The load cell includes a flexible strain element having first and second end portions that can be used to mount the load cell to the phalange and a center portion that can be used to mount a suitable contact surface to the load cell. The strain element also includes a first S-shaped member including at least three sections connected to the first end portion and the center portion and a second S-shaped member including at least three sections coupled to the second end portion and the center portion. The load cell also includes eight strain gauge pairs where each strain gauge pair is mounted to opposing surfaces of one of the sections of the S-shaped members where the strain gauge pairs provide strain measurements in six-degrees of freedom.

20 Claims, 3 Drawing Sheets

PHALANGE TACTILE LOAD CELL

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefor.

BACKGROUND OF THE INVENTION

1. Field of the Invention

This invention relates generally to a load cell and, more particularly, to a tactile load cell for measuring the load on a phalange of a robotic finger or miniature manipulator where the load cell measures loads in six-degrees of freedom.

2. Description of the Related Art

Modern times have seen an increasing use of dexterous robot systems, especially in applications such as assembly lines and welding lines of manufacturing plants. This can be attributed to the high degree of precision and efficiency with which robots work. One latest development has been the introduction of autonomous robots, that is, robots which can perform desired tasks in unstructured environments without continuous human guidance. In applications where robotic arms are used, autonomous task control of the robotic system can be improved by obtaining detailed information about the load experienced at each contact point of the fingers attached to the arms. Monitoring the load acting on each section of a finger helps to ensure that the proper force is being exerted to accomplish a particular task. Further, unexpectedly high or low load observations can be used to identify malfunctions or undesirable conditions, such as slippage.

One existing technique used to measure the load experienced on the fingers of a robotic hand includes single axis contact sensors. However, the inability of such sensors to measure forces acting along more than one axis compromises the load resolution provided by the sensors.

Another known system uses commercial load cells to measure the load value. However, the load cells used in such systems typically have unacceptable sizes and cannot be housed inside every section of a finger of the robotic hand.

SUMMARY OF THE INVENTION

In accordance with the teachings of the present invention, a tactile load cell is disclosed that has particular application for measuring the load on a phalange in a dexterous robot system. The load cell includes a flexible strain element having first and second end portions that can be used to mount the load cell to the phalange and a center portion that can be used to mount a suitable contact surface to the load cell. The strain element also includes a first S-shaped member including at least three sections connected to the first end portion and the center portion and a second S-shaped member including at least three sections coupled to the second end portion and the center portion. The load cell also includes eight strain gauge pairs where each strain gauge pair is mounted to opposing surfaces of one of the sections of the S-shaped members where the strain gauge pairs provide strain measurements in six-degrees of freedom.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a tactile load cell is merely exemplary in nature, and is in no way intended to limit the invention or its applications or uses. For example, the tactile load cell of the invention has specific application for measuring the load on a phalange of a robotic finger. However, as will be appreciated by those skilled in the art, the tactile load cell of the invention may have other applications.

Figure 1:
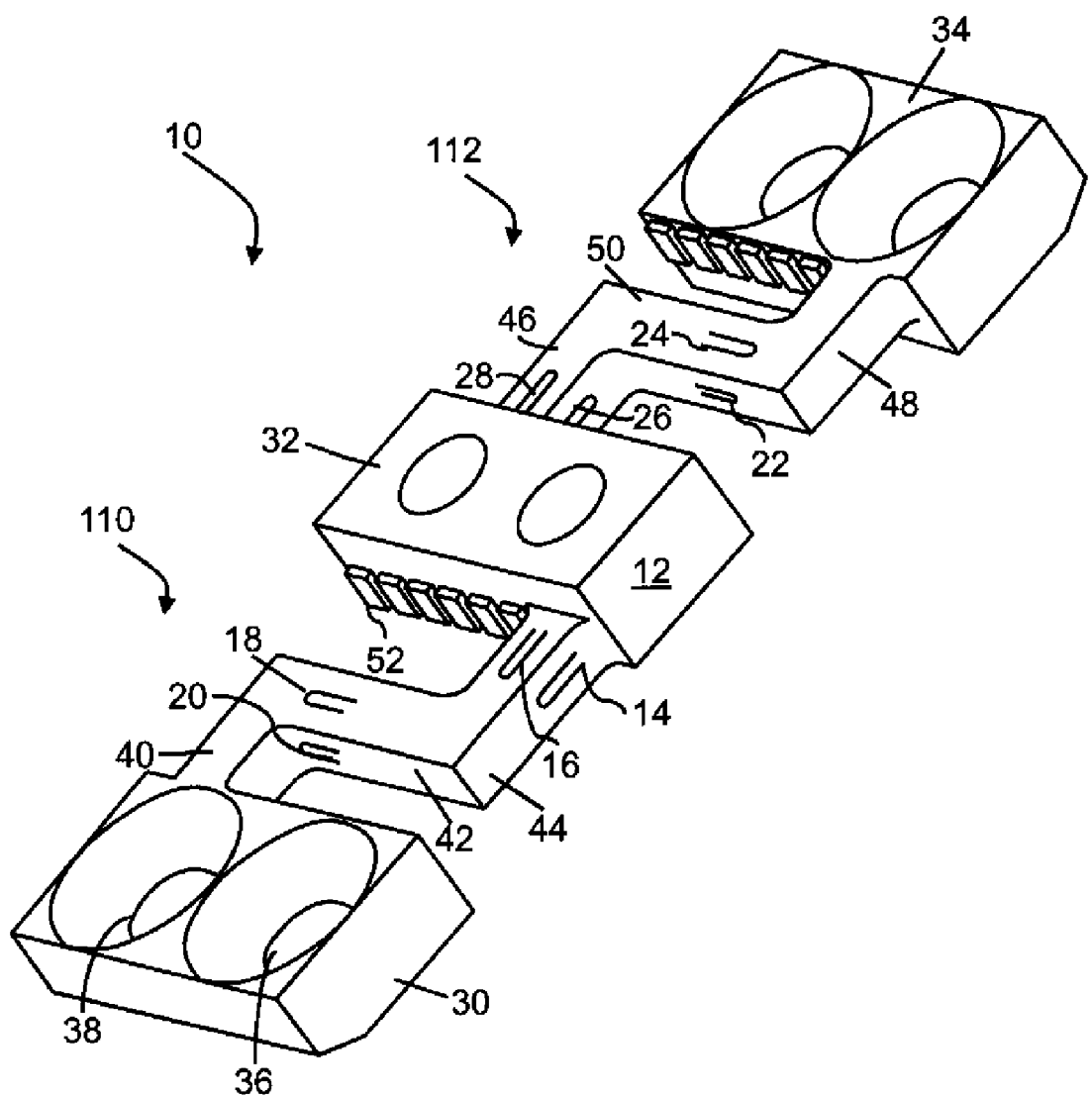
FIG. 1 illustrates a tactile load cell for a robotic hand, according to one embodiment.

FIG. 1 is a perspective view of a tactile load cell 10 that has particular application to measure the load on a phalange of a dexterous robot system. As will be discussed below, the load cell 10 is able to simultaneously measure force in six directions, namely, three linear directions and three rotational directions. The load cell 10 includes a single body strain element 12 made of a suitable flexible material, such as aluminum. As will be discussed below, the strain element 12 is designed to maximize the measureable bending strain within the range of design loads, and within the limited space available on the phalanges of the dexterous robot system. The strain element 12 can be a single piece member manufactured or molded from the flexible material, or can be an assembly of the various elements discussed below coupled together by a suitable technique. The strain element 12 includes a first end mounting portion 30 and a second end mounting portion 34 having holes 36 and 38 that allow the load cell 10 to be mounted at a desired location. The strain element 12 also includes a central mounting portion 32 provided to mount a suitable contact surface to the load cell 10.

The strain element 12 also includes a first S-shaped member 110 coupled to the first end mounting portion 30 and the central mounting portion 32 and a second S-shaped member 112 coupled to the second end mounting portion 34 and the central mounting portion 32, as shown. The S-shaped member 110 includes sections 40, 42 and 44 and the S-shaped member 112 includes sections 46, 48 and 50. In this non-limiting embodiment, the sections 40-50 are square or rectangular in cross-section, however, other shapes may be equally applicable.

In order to measure the strain on the S-shaped members 110 and 112, strain gauge pairs are provided on certain ones of the sections 40-50. Particularly, strain gauge pair 14 is provided on opposing sides of the section 44, strain gauge pair 16 is provided on the other opposing sides of the section 44, strain gauge pair 18 is provided on opposing sides of the section 42, strain gauge pair 20 is provided on the other opposing sides of the section 42, strain gauge pair 22 is provided on opposing sides of the section 50, strain gauge pair 24 is provided on the other opposing sides of the section 50, strain gauge pair 26 is provided on opposing sides of the section 46 and strain gauge pair 28 is provided on the other opposing sides of the section 46. Thus, any flexing or bending of the S-shape members 110 and 112 in six-degrees of freedom will be measured by the appropriate strain gauge pairs. In one non-limiting embodiment, the strain gauge pairs 14-28 are semiconductor strain gauges, although other types of strain gauges may be applicable.

A plurality of electrical contactors 52 are provided on the mounting portions 30, 32 and 34 that provide an electrical connection to the strain gauge pairs 14-28, and allow connections from the load cell 10 to control circuitry (not shown).

Figure 2:
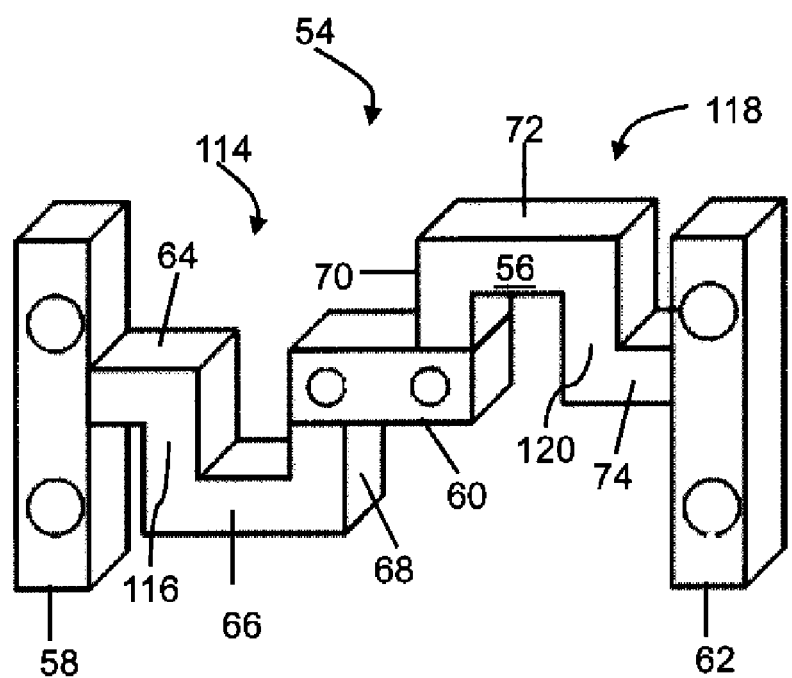
FIG. 2 illustrates a tactile load cell for a robotic hand, according to another embodiment.

FIG. 2 is a perspective view of a tactile load cell 54 similar to the load cell 10 and based on the same principals for providing measurement of strain in six-degrees of freedom. In this embodiment, the load cell 54 includes a strain element 56 having end mounting portions 58 and 62 and center mounting portion 60. Further, the strain element 56 includes a first curved member 114 having four rectangular shaped sections 64, 66, 68 and 116 and a second curved member 118 having four rectangular shaped sections 70, 72, 74 and 120. The first curved member 114 is coupled to the end portion 58 and the center portion 60 and the second curved member 118 is coupled to the end portion 62 and the center portion 60. The strain element 56 can be a single piece member molded or manufactured of a single piece of flexible material, such as aluminum, or can be an assembly of parts, where each of the first end portion 58, the second end portion 62, the center portion 60, the first curved portion 114, and the second curved member 118 are all separate members assembled together in a suitable manner. As with the load cell 10, strain gauge pairs are provided at the appropriate location of the sections 64-74, 116 and 120 to measure the strain in the six-degrees of freedom.

Figure 3:
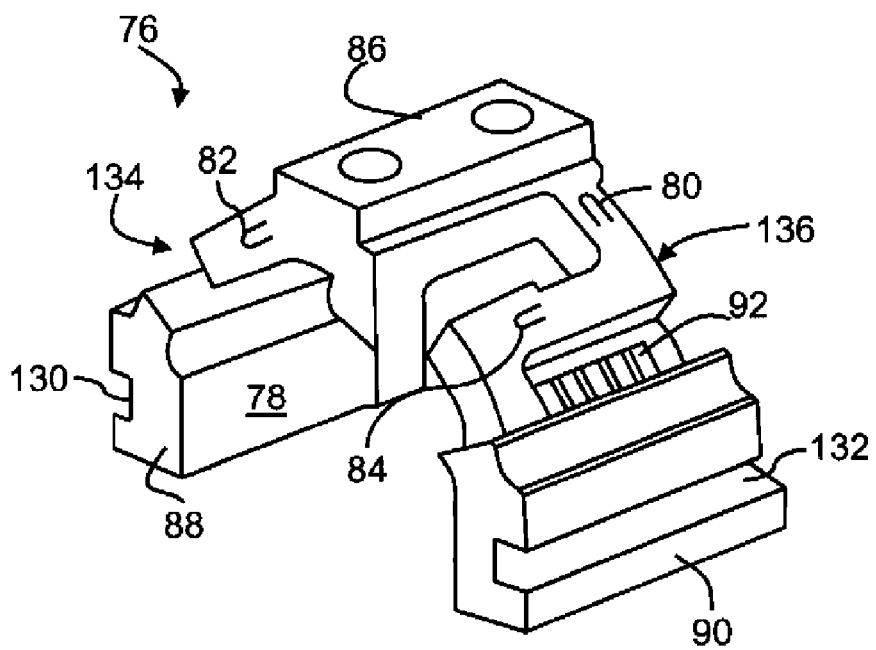
FIG. 3 illustrates a tactile load cell for a robotic hand, according to another embodiment.

FIG. 3 is a perspective view of a tactile load cell 76 having a strain element 78 shaped as an arch. The load cell 76 has the same elements as the load cell 10, but is formed in the arched configuration to better mount to a particular phalange of a dexterous robot system. Particularly, the load cell 76 includes end portions 88 and 90 including slots 130 and 132, respectively, for mounting the load cell 76 to the phalange. Further, the strain element 78 includes a center portion 86 including holes for securing a suitable contact surface to the load cell 76. The load cell 76 also includes a first S-shaped member 134 mounted to the end portion 88 and the center portion 86, and having three sections forming a curved S-shape, and a second S-shaped member 136 mounted to the end portion 90 and the center portion 86, and having three sections forming a curved S-shape. Further, eight strain gauge pairs, for example, strain gauge pairs 80, 82 and 84, are coupled to the S-shaped members 134 and 136 to measure the strain in six-degrees of freedom.

The load cell 76 also includes a flex circuit 92 in place of conventional wires to provide the electrical connection between the strain gauges and other electronic circuitry. The flex circuit 92 forms part of the arch shape of the strain element 56.

Figure 4:
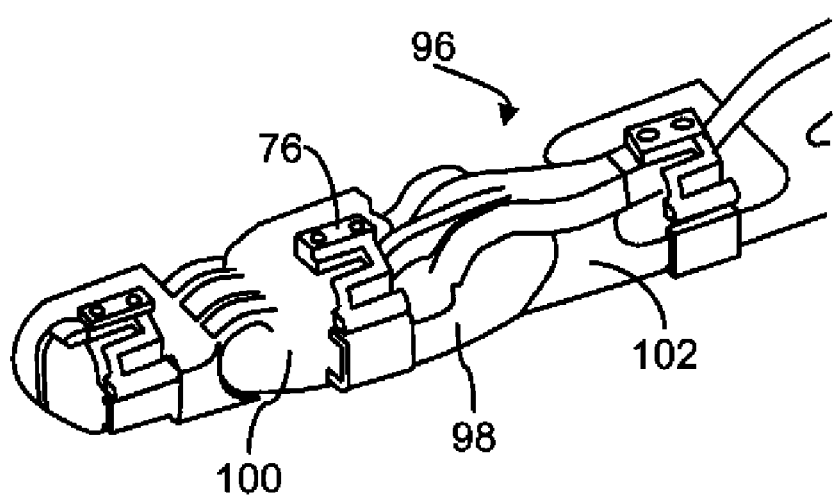
FIG. 4 is a perspective view of a finger for a dexterous robot system that employs the tactile load cell shown in FIG. 3.
Figure 5:
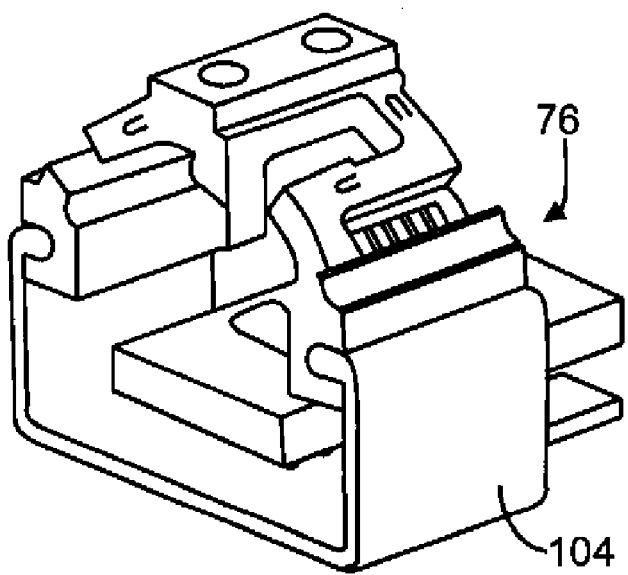
FIG. 5 is a perspective view of the load cell shown in FIG. 4 separated from the phalange and mounted to a mounting element in the phalange.

FIG. 4 is a perspective view of a finger 96 that is part of a robotic hand in a dexterous robot system. The finger 96 includes various phalanges 98 connected by rotating joints 100 and 102. The finger 96 includes three of the load cells 76 mounted to each phalange 98. FIG. 5 is a perspective view of one of the load cells 76 mounted to a mounting element 104 where the element 104 is shaped to be positioned within the slots 130 and 132. The arched configuration of the load cell 76 is specifically for the shape of the phalange 98 for this particular application.

The load cells are used to measure the load experienced by each finger as the robotic hand tries to perform as task. As the fingers experience a load, the strain element gets distorted. The distortion of the strain element is captured by the strain gauges mounted on the strain element and is converted into an electric signal. The signal is amplified using a half bridge circuit. However, it will be readily apparent to any person with ordinary skill in the art that the signal of the strain gauges can be amplified by means other than the one discussed in the embodiment given above. The signals from the load cell can be used to interpret a variety of information such as the nature and direction of the force acting on the finger, whether there is slippage or not, or whether the finger is pointing or grasping. The strain gauges are used in pairs which enables them to capture bending moments. The load cell is calibrated before being mounted in the robotic hand. During calibration, a known force is applied on the load cell. The signal of each strain gauge is noted and the combined signal is compared with the known force value. A multiplying factor, that is, the value by which the load cell signal is to be multiplied to get the actual force, is calculated based on this comparison. This multiplying factor is retained for use load cell is used in the robotic hand.

Various embodiments of the present invention offer one or more advantages. The present invention provides a robotic hand and a load cell used in it. The load cell of the present invention is of reduced size and is compact enough to fit inside a finger of the robotic hand. Further, the load cell configured to have six-degrees of freedom, and thus provides both direction and orientation information for applied loads.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tactile load cell comprising:
a flexible strain element including a first end portion, a second end portion and a center portion, said strain element further including a first S-shaped member having at least three sections and being coupled to the first end portion and the center portion and a second S-shaped member having at least three sections and being coupled to the second end portion and the center portion; and
a plurality of strain gauge pairs mounted to the first and second S-shaped members where each strain gauge pair is mounted to opposing sides of one of the sections of the S-shaped members, wherein at least one of the strain gauge pairs is mounted to opposing sides of one of the three sections of the first or second S-shaped member and another of the strain gauge pairs is mounted to two other opposing sides of the same section that the at least one strain gauge pair is mounted to.

2. The load cell according to claim 1 wherein the plurality of strain gauge pairs is eight strain gauge pairs providing strain measurements in six-degrees of freedom.

3. The load cell according to claim 2 wherein a first strain gauge pair is mounted to opposing surfaces of a first section of the first S-shaped member, a second strain gauge pair is mounted to two other opposing surfaces of the first section of the first S-shaped member, a third strain gauge pair is mounted to opposing surfaces of a second section of the first S-shaped member, a fourth strain gauge pair is mounted to two other opposing surfaces of the second section of the first S-shaped member, a fifth strain gauge pair is mounted to opposing surfaces of a first section of the second S-shaped member, a sixth strain gauge pair is mounted to two other opposing surfaces of the first section of the second S-shaped member, a seventh strain gauge pair is mounted to opposing surfaces of the second section of the second S-shaped member and an eighth strain gauge pair is mounted to two other opposing surfaces of the second section of the second S-shaped member.

4. The load cell according to claim 1 wherein the sections of the first and second S-shaped members are rectangular in cross-section.

5. The load cell according to claim 1 wherein the strain element is made of aluminum.

6. The load cell according to claim 1 wherein the first and second end portions and the middle portion include mounting holes for mounting the load cell to a robotic finger.

7. The load cell according to claim 1 wherein the first and second end portions include coupling slots.

8. The load cell according to claim 1 wherein the strain element has a general U-shape.

9. The load cell according to claim 1 wherein the first and second S-shaped members each include four separate sections.

10. The load cell according to claim 1 wherein the load cell is part of a phalange in a dexterous robotic system that measures load on the phalange.

11. A tactile load cell comprising:
a flexible strain element including a first end portion, a second end portion and a center portion, said strain element further including a first S-shaped member including three sections and being coupled to the first end portion and the center portion and a second S-shaped member including three sections and being coupled to the second end portion and the center portion, said first and second S-shaped members having a curved configuration so that the strain element has a general U-shape; and
eight strain gauge pairs mounted to the first and second S-shaped members where each strain gauge pair is mounted to opposing sides of one of the sections of the S-shaped members and where the first S-shaped member includes four of the strain gauge pairs and the second S-shaped member includes the other four of the strain gauge pairs, said eight strain gauge pairs providing strain measurements in six-degrees of freedom, wherein at least one of the strain gauge pairs is mounted to opposing sides of one of the three sections of the first or second S-shaped member and another of the strain gauge pairs is mounted to two other opposing sides of the same section that the at least one strain gauge pair is mounted to.

12. The load cell according to claim 11 a first strain gauge pair is mounted to opposing surfaces of a first section of the first S-shaped member, a second strain gauge pair is mounted to two other opposing surfaces of the first section of the first S-shaped member, a third strain gauge pair is mounted to opposing surfaces of a second section of the first S-shaped member, a fourth strain gauge pair is mounted to two other opposing surfaces of the second section of the first S-shaped member, a fifth strain gauge pair is mounted to opposing surfaces of a first section of the second S-shaped member, a sixth strain gauge pair is mounted to two other opposing surfaces of the first section of the second S-shaped member, a seventh strain gauge pair is mounted to opposing surfaces of the second section of the second S-shaped member and an eighth strain gauge pair is mounted to two other opposing surfaces of the second section of the second S-shaped member.

13. The load cell according to claim 11 wherein the sections of the first and second S-shaped members are rectangular in cross-section.

14. The load cell according to claim 11 wherein the strain element is made of aluminum.

15. The load cell according to claim 11 wherein the load cell is part of a phalange in a dexterous robotic system that measures load on the phalange.

16. A tactile load cell for measuring strain in a phalange of a dexterous robot system, said load cell comprising:
a flexible strain element including a first end portion, a second end portion and a center portion, said strain element further including a first S-shaped member having at least three sections and being coupled to the first end portion and the center portion and a second S-shaped member having at least three sections and being coupled to the second end portion and the center portion; and
eight strain gauge pairs mounted to the first and second S-shaped members such that each strain gauge pair is mounted to opposing sides of one of the sections of the S-shaped member, wherein the first S-shaped member includes four of the strain gauge pairs and the second of the S-shaped members includes the other four of the strain gauge pairs and wherein the strain gauge pairs provide strain measurements and six-degrees of freedom, wherein at least one of the strain gauge pairs is mounted to opposing sides of one of the three sections of the first or second S-shaped member and another of the strain gauge pairs is mounted to two other opposing sides of the same section that the at least one strain gauge pair is mounted to.

17. The load cell according to claim 16 a first strain gauge pair is mounted to opposing surfaces of a first section of the first S-shaped member, a second strain gauge pair is mounted to two other opposing surfaces of the first section of the first S-shaped member, a third strain gauge pair is mounted to opposing surfaces of a second section of the first S-shaped member, a fourth strain gauge pair is mounted to two other opposing surfaces of the second section of the first S-shaped member, a fifth strain gauge pair is mounted to opposing surfaces of a first section of the second S-shaped member, a sixth strain gauge pair is mounted to two other opposing surfaces of the first section of the second S-shaped member, a seventh strain gauge pair is mounted to opposing surfaces of the second section of the second S-shaped member and an eighth strain gauge pair is mounted to two other opposing surfaces of the second section of the second S-shaped member.

18. The load cell according to claim 16 wherein the strain element has a general U-shape.

19. The load cell according to claim 16 wherein the first and second end portions include coupling slots.

20. The load cell according to claim 16 wherein the strain element is made of aluminum.

* * * * *